(12) United States Patent
Spaling

(10) Patent No.: US 12,276,505 B2
(45) Date of Patent: Apr. 15, 2025

(54) METHOD AND SYSTEM FOR AIDING EMERGENCY RESPONDERS IN RETRIEVING A PATH

(71) Applicant: TEIJIN ARAMID B.V., Arnhem (NL)

(72) Inventor: Gerke Spaling, Enschede (NL)

(73) Assignee: TEIJIN ARAMID B.V., Arnhem (NL)

( * ) Notice: Subject to any disclaimer, the term of this patent is extended or adjusted under 35 U.S.C. 154(b) by 260 days.

(21) Appl. No.: 17/919,177

(22) PCT Filed: Apr. 15, 2021

(86) PCT No.: PCT/EP2021/059728
§ 371 (c)(1),
(2) Date: Oct. 14, 2022

(87) PCT Pub. No.: WO2021/209529
PCT Pub. Date: Oct. 21, 2021

(65) Prior Publication Data
US 2023/0160698 A1    May 25, 2023

(30) Foreign Application Priority Data
Apr. 17, 2020 (EP) .................................. 20170119

(51) Int. Cl.
*G01C 21/16* (2006.01)
*G01C 21/00* (2006.01)
(Continued)

(52) U.S. Cl.
CPC ............. *G01C 21/16* (2013.01); *G01C 21/14* (2013.01); *G01C 21/3652* (2013.01); *G01C 21/3844* (2020.08); *G08B 6/00* (2013.01)

(58) Field of Classification Search
None
See application file for complete search history.

(56) References Cited

U.S. PATENT DOCUMENTS 10,545,026 B1 *   1/2020   Schaefer ............ G01C 21/3476
11,408,749 B2 *   8/2022   Schad, Jr. .......... G01C 21/3679
(Continued)

FOREIGN PATENT DOCUMENTS

| KR | 10-2013-0086861 A | 8/2013 |
|----|-------------------|--------|
| WO | 2011/060388 A1 | 5/2011 |
| WO | 2018/178358 A1 | 10/2018 |

OTHER PUBLICATIONS

Aug. 11, 2021 International Search Report issued in International Patent Application No. PCT/EP2021/059728.

*Primary Examiner* — Christian Chace
*Assistant Examiner* — Shayne M. Gilbertson
(74) *Attorney, Agent, or Firm* — Oliff PLC

(57) ABSTRACT

A method for aiding emergency responders in retrieving a path, including receiving motion data from a first motion sensor registering motion of a first emergency responder of at least one emergency responder exploring an emergency scene; compiling track data based on the motion data of the first motion sensor, wherein the track data represents a first track of the first emergency responder through the emergency scene; calculating path data based on the track data, wherein the path data represents a path coinciding with at least a part of the track; and providing the path data to an actuator arranged for guiding an emergency responder of the at least one emergency responder along the path.

14 Claims, 11 Drawing Sheets

(51) Int. Cl.
    *G01C 21/14*     (2006.01)
    *G01C 21/36*     (2006.01)
    *G08B 6/00*     (2006.01)

(56) References Cited

U.S. PATENT DOCUMENTS

| | | | |
|---|---|---|---|
| 2003/0214397 A1* | 11/2003 | Perkins | G08B 21/12 340/539.13 |
| 2011/0054836 A1 | 3/2011 | Foxlin | |
| 2012/0047083 A1 | 2/2012 | Qiao et al. | |
| 2012/0130632 A1* | 5/2012 | Bandyopadhyay | G01C 21/206 342/357.3 |
| 2017/0030720 A1* | 2/2017 | Moore | H04W 4/33 |
| 2018/0328737 A1* | 11/2018 | Frey | H04W 4/33 |
| 2021/0123745 A1* | 4/2021 | Lingard | G01C 21/206 |

\* cited by examiner

METHOD AND SYSTEM FOR AIDING EMERGENCY RESPONDERS IN RETRIEVING A PATH

FIELD OF THE INVENTION

The invention relates to a method for aiding emergency responders in retrieving a path. The invention also relates to a system for aiding emergency responders in retrieving a path. The invention more specifically relates to aiding fire fighters in back tracking their path to safety from an emergency scene.

BACKGROUND OF THE INVENTION

Emergency responders, such as fire fighters, may have to enter objects, such as buildings or houses, while this object is on fire. The smoke of this fire may obscure or even make it impossible to visually navigate inside of the object. Emergency responders are educated in how to navigate in this kind of circumstances. But still, having your visual perception impaired greatly reduces the effectiveness of the emergency responder. And even without the visual perception of the emergency responder impaired, emergency responders do get lost in building, such as complex building, when navigating the building.

Systems aiding the navigation inside buildings typically use wireless networks of some kind to determine the location of the person aided in their navigation. Such systems are for example known from WO2019206894 A1. Emergency responders are typically working in an emergency situation where the wireless network may be deprived of power making navigating emergency scenes based on a wireless network highly unreliable.

SUMMARY OF THE INVENTION

An object of the invention is to overcome one or more of the disadvantages mentioned above. According to a first aspect of the invention, a method for aiding emergency responders in retrieving a path, comprising:
  receiving motion data from a first motion sensor registering motion of a first emergency responder of at least one emergency responder exploring an emergency scene;
  compiling track data based on the motion data of the first motion sensor, wherein the track data represents a first track of the first emergency responder through the emergency scene;
  calculating and/or determining path data based on the track data, wherein the path data represents a path coinciding with at least a part and/or section of the track; and
  providing the path data to an actuator arranged for guiding an emergency responder of the at least one emergency responder along the path.

Emergency responders or first responders are typically people reacting to emergency situations. An example of an emergency situation may be a fire in an object, such as a building, house or flat. Another example of an emergency situation may be an incident in an industrial area involving fire, explosion, hazardous substances, toxic contamination or a combination. Smoke, fumes, gasses, vapours, fog or the like may hamper, limit or prevent the use of sight of an emergency responder.

In these emergency situations, the situation may deteriorate rapidly to a level where the emergency responder has to leave the emergency scene for his own safety. The emergency responder, when entering, exploring and/or examining the emergency scene has travelled a track. As this track is already travelled, upon entry, this track is validated in the sense that it can be traversed. This track may be used as a validated path for exiting the emergency scene. Thus, this method or system according to the invention has the effect to allow the emergency responder to evacuate the emergency scene along a validated path.

And if the emergency situation is deteriorating in a different way, the emergency responder may need the support of another emergency responder, e.g. when carrying an unconscious victim. Therefore, the other emergency responder may need to get to the first emergency responder as quickly as possible. The emergency responder, when entering, exploring and/or examining the emergency scene has travelled a track. As this track is already travelled, upon entry, this track is validated in the sense that it can be traversed such as safely traversed. This track may be used as a validated path through the emergency scene. This method or system according to the invention has the effect to allow the other emergency responder to use a validated path to the first emergency responder.

A motion sensor may comprise a gyroscope, a compass or any other means to measure travel direction and distance. This motion sensor can be placed anywhere on the first emergency responder. There is however an advantage in positioning the motion sensor on or close to a boot or shoe of an emergency responder. This allows that when the foot is positioned firmly on the ground, this moment in time may be used to recalibrate the motion sensor to prevent offset or drift. To compensate for this, another motion sensor on the same emergency responder may be used, preferably this other motion sensor is placed on another location on the first emergency responder, such as on the other boot or shoe. Being attached to the same emergency responder, the correlation in movement between the motion sensors can be exploited to enhance the overall accuracy. The motion sensor may also be supplemented by a GPS sensor to calibrate the motion sensor to an absolute position. GPS signal is typically of bad quality or absent inside an object, such as a building, and is therefore not a reliable sensor for the whole track. A sensor providing an absolute reference, such as a GPS sensor may however be used to align the motion data of multiple emergency responders. Furthermore, the motion sensor may be supplemented by an air pressure sensor for measuring the height or altitude. Outside air pressure may be used to get an initial reading, but inside e.g. in windy conditions caused by fire the air pressure sensor may be unreliable. On the other hand, if air pressure inside an object is not disturbed by e.g. the emergency situation, the air pressure sensor may supplement the detection of the level or altitude inside the object. The motion sensor may also be supplemented by a compass sensor measuring the earth magnetic field. Typically, outside an object the compass sensor provides a good indication of the heading. Inside an object the compass sensor reading may be disturbed by materials, e.g. iron, disturbing the earth magnetic field. These materials may be used in the structure of the object. The GPS sensor, the air pressure sensor and/or the compass sensor may also be used to align the motion data of multiple emergency responders. The GPS sensor, the air pressure sensor and/or the compass sensor may also be used to supplement the motion sensor such that the track data becomes more accurate.

Motion data is the data from the motion sensor. The motion data typically comprises a direction and a distance travelled by the motion sensor from one reference point to another. If the motion sensor is positioned close to the boot or shoe of the emergency responder, the motion data typically comprises distance and direction between successive positions of the boot or shoe on the ground.

In an embodiment of the invention, calculating and/or determining the path data comprises:
  recognizing crossings in the track data for recognizing parallel tracks between crossings;
  selecting one of the parallel tracks for the path data. Parallel tracks between crossings may be called parallel track sections or track parts. A track section or track part may also be a smaller or larger part of a track. This advantageously allows to select track sections for the path data having a particular property. Properties taken into consideration for selecting may be the length of, the number of curves in, the duration to travel, the straightness of, and/or the closeness to other track sections of a track section.

In an embodiment of the invention,
  calculating the path data comprises calculating the length of each of the parallel tracks between crossings, and/or calculating the travel time of each of the parallel tracks; and
  selecting one of the parallel tracks is based on the length and/or the travel time of the parallel tracks. The embodiment advantageously allows to select the shortest path in length or the shortest path in time. Additionally, a combination of the length of a track section and the travel time of the track section may be taken into account.

In an embodiment of the invention, the actuator is a haptic actuator, preferably wherein the haptic actuator comprises a plurality of tactile actuators, preferably arranged around the waist of the responder, arranged for providing a directional sensation to the emergency responder for guiding the emergency responder. In a further embodiment, the haptic actuators are part of a navigation belt typically worn around the waist. In a further embodiment, the haptic actuators may be arranged around a leg or an arm. In another embodiment, the haptic actuators may be arranged in a shoe or glove. In even another embodiment, the haptic actuators may be arranged around the head, such as on the inside of a helmet or cap worn by the emergency responder. These embodiments provide the advantage of silent, direct feeling, and/or no hinderance by noise. A special advantage may be that when one or more of the senses of the emergency responder are hampered by its protective gear, such as hearing and/or vision, these embodiments provide the aforementioned advantages.

In an embodiment of the invention, the embodiment comprises receiving motion data from a second motion sensor registering motion of a second emergency responder of at least one emergency responder exploring an emergency scene; and wherein compiling track data is also based on the motion data of the second motion sensor. When the first emergency responder and the second emergency responder are both exploring the same emergency scene, data from both the motion sensors may be advantageously used to enrich the track data. Typically, when both the emergency responders explore the emergency scene, they will just step or walk slightly different from each other. The situation of both the emergency scene is especially applicable for firefighters as they typically explore an emergency scene, such as a building on fire, in pairs. As the motion data from both does not completely overlap, this will provide more insight in the emergency scene and especially where the following emergency responders may or most likely walk another track through the building. In a further advantageous embodiment, the second emergency responder exploring the scene is guided along a path based on the track data from the first emergency responder, while enriching the track data with the motion data from the second motion sensor carried by himself. This enriching may be done real-time, such that the calculating and/or determining of the path data is done on the real-time enriched track data.

In an embodiment of the invention, the emergency responder is the first emergency responder. In this case the emergency responder is typically advantageously backtracking its own track to leave the emergency scene or at least getting closer to leaving the emergency scene.

In an embodiment of the invention, the emergency responder is a/the second or a third emergency responder. In this case the emergency responder may be on route through the emergency scene to support the first emergency responder. The method advantageously provides a path to find the first emergency responder. This may be especially advantageous is the first emergency responder got into trouble and is in need of additional equipment or assistance in leaving the emergency scene.

In an embodiment of the invention, compiling the track data comprises:
  obtaining the location and/or orientation of the first motion sensor on the body of the first emergency responder and/or equipment carried by the first emergency responder, wherein preferably obtaining the location and/or orientation of the first motion sensor comprises retrieving a predefined location and/or orientation of the first motion sensor, or wherein preferably obtaining the location and/or orientation of the first motion sensor comprises deducing the location and/or orientation of the first motion sensor from the motion data;
  obtaining a track width; and
  establishing the track data based on the motion data, the track width, and the location and/or orientation of the first motion sensor. The first emergency responder has a particular width of his body. Hence, the track data may be enriched by the width of the first emergency responder. This enriched track data will show that more area is traversed by the first emergency responder, namely that not a single line but a wide track is traversed and/or covered. As more area is traversed, it advantageously becomes more likely to find crossings for optimizing the calculating and/or determining of the path. Shortcuts may be found more easily. Furthermore, if multiple emergency responders enrich the track data with their motion data in combination with taking notice of the track width, the area traversed is advantageously even more increased, given even more likelihood of finding crossings for optimizing the calculating and/or determining of the path.

The motion sensor is typically arranged to a shoe, but might be on any part of the body or any equipment carried by the first emergency responder. The method may be able to deduce on which shoe the motion sensor is placed. Alternatively, the method may be provided with this information, e.g. as predefined value or just before use. If the motion sensor is placed excentre to the central axis of the body, such as on the shoe, the track data of the first emergency responder extends more to one side compared than to the other side. The motion data may indicate the location of the motion sensor on the body. For example, if the motion data shows a clear moment in time of no movement, the motion sensor is likely to be arranged to a shoe or lower leg, which is regularly firmly placed on the ground. As another example, when it is deduced or predefined that the motion sensor is arranged to a shoe or lower leg, the radii of the curve left and right may indicate if the motion sensor is arranged to the left or right shoe or lower leg.

In an embodiment of the invention, receiving the motion data is at least partly overlapping in time with providing the path data. This allows for example a second emergency responder to traverse a path while the first emergency responder is still enriching the track data as he traverses the emergency scene. In this way the second emergency responder may "catch up" with the first emergency responder. In an alternative scenario, the first emergency responder may backtrack or partly backtrack his steps or route along a path calculated according to the invention.

In an embodiment of the invention, calculating the path data comprises:

loading a building information model; and
optimizing the path data based on the building information model. A building information model may be available of a building. In case this building information model is available, it may advantageously be used by the method for optimizing the path data. The optimization may comprise recognizing separate rooms. The optimization may comprise recognizing walls separating spaces. The optimization may comprise recognizing shortcuts by recognizing that a path relative to a track may be placed closer to a wall. This allows for example to cut corners when the track section is taking a wider track around corners. The optimization may comprise recognizing that a path may pass through an opening, such as a door, while the track does not pass through this opening. This allows for a track to be straightened between two waypoints, for example the entry and exit points of a room.

In a further embodiment of the invention, optimizing the path data comprises recognizing crossings based on the building information model. The optimization may comprise recognizing shortcuts by recognizing different track sections just not crossing, but still being labelled as a crossing based on the proximity of the track sections and the building information model. The optimization may comprise recognizing that track sections cannot be labelled as a crossing due to a separation, such as a wall, being present according to the building information. In this way, the recognition of crossing is advantageously corrected or optimized.

In an even further embodiment of the invention, optimizing the path data comprises recognizing crossings, which comprises recognizing an alternative parallel track based on the building information model. The alternative parallel track may solely be based on the building information model without the alternative parallel track being traversed by an emergency responder of the at least one emergency responder. The combination of recognizing an additional crossing and/or removing a location labelled as crossing allows to advantageously optimize calculating of the path data or recognizing parallel tracks. Having more parallel tracks and/or better validated parallel tracks increases the certainty of correctness of the path data derived from the track data.

In an embodiment of the invention, knowledge of the location and/or orientation of the motion sensor, track width and availability of the building information model is combined. This may be combined advantageously for the emergency responder being the first emergency responder, or for the emergency responder being the second emergency responder. The combination of the track width and the building information allows to recognize or reject possible crossings when based solely on the track data. This combination advantageously allows to establish with a higher degree of certainty if a crossing in the track data is present, thus increasing the dependability of the method.

In an embodiment of the invention, the track data represents the gross displacement of the first emergency responder and wherein the path data is arranged for guiding the emergency responder along the path providing a net displacement. The track data incorporates all steps, small and large, forward, backward and sideways. This typically allows the track data, preferably combined with the track width knowledge and use, to cover a larger area of the emergency scene. This larger coverage provides more options to find crossings in the track data for advantageously optimizing calculating the path data. The path data typically filters out these small and large steps, forward, backward and side steps to provide a direct route to the emergency responder, preferably a smooth path.

In an embodiment of the invention, the track data represents a displacement of the first emergency responder. The motion data typically comprises a direction and distance travelled by the motion sensor from one reference point to another. Compiling track data may comprise aggregating this motion data into track data representing a track travelled by the first emergency responder. The track data advantageously represents the displacement of the first emergency responder. The track data advantageously may comprise a track width further detailing the representation of the track travelled by or displacement of the first emergency responder.

In an embodiment of the invention, the embodiment comprises receiving a label labelling a particular location; and
wherein compiling track data is also based on the received label, preferably the received label indicates a blockade of at least a part and/or section of, a point necessarily inserted in, and/or a relevant point for the path and/or the track. The label may be provided by the first emergency responder. The first emergency responder may indicate a blockade on the track and/or may indicate a location that certainly needs to be passed by the emergency responder. The first emergency responder may indicate a location where something is to be picked up, such as a person in distress or materials, by the emergency responder. Alternatively, the label may be provided by the emergency responder. The label may be indicative of a blockade of the path. The label may to confirm the pick up of the person in distress or materials. The label may be provided with a simple push button, or a more elaborate interface provided to the first emergency responder or the emergency responder. In a further embodiment of the invention, the label advantageously represents a location to be avoided and/or a location necessarily inserted in the path data and/or all other kinds of information about the building, the area and/or the path that are relevant to the actual situation and/or emergency scene for aiding emergency responders in retrieving the path.

According to another aspect of the invention, a system comprising a microprocessor arranged and advantageously loaded with software for carrying out any of the methods or at least steps of these methods as described.

According to another aspect of the invention, a system for aiding emergency responders in retrieving a path, comprising:
- a first motion sensor unit configured for registering motion of a first emergency responder of at least one emergency responder exploring an emergency scene;
- a processing unit configured for:
- receiving motion data from the first motion sensor;
- compiling track data based on the motion data of the first motion sensor, wherein the track data represents a first track of the first emergency responder through the emergency scene;
- calculating path data based on the track data, wherein the path data represents a path coinciding with at least a part of the track; and
- providing the path data; and
- an actuator arranged for receiving the path data and guiding an emergency responder of the at least one emergency responder along the path. The technical effect of this system is according to the technical effect described for the method. The system for aiding the emergency responder may advantageously be combined with features of other embodiments, system and method, described.

In an embodiment of the invention, the path data comprises waypoints. The waypoints are preferably located at strategic locations, such as room entry and room exit locations, track crossings, and/or at locations where the path takes a curve and/or makes a bent.

According to another aspect of the invention, a method for aiding a second emergency responder of at least one emergency responder in retrieving a path, comprising:
- arranging an actuator to the body of the second emergency responder; and
- providing path data representing a path to the actuator for guiding the emergency responder along the path, wherein the path data is obtained according to any of the methods described. The technical effect of this method is according to the technical effect described. The method for aiding the second emergency responder may advantageously be combined with features of other embodiments described.

In an embodiment of the invention, the second emergency responder advantageously follows the path to a location of the first emergency responder. This provides a simple, dependable and secure way for the second emergency responder to find or get to the location of the first emergency responder.

According to another aspect of the invention, a method for aiding a first emergency responder of at least one emergency responder in retrieving a path, comprising:
- arranging a first motion sensor to the body of the first emergency responder;
- receiving motion data from the first motion sensor registering motion of the first emergency responder exploring the emergency scene;
- compiling track data based on the motion data, wherein the track data represents a first track of the first emergency responder through the emergency scene;
- calculating and/or determining path data based on the track data, wherein the path data represents a path coinciding with at least a part and/or section of the track;
- arranging an actuator to the body of an emergency responder of the at least one emergency responder; and
- providing the path data to the actuator for guiding the emergency responder along the path. The technical effect of this method is according to the technical effect described. The method for aiding the first emergency responder may advantageously be combined with features of other embodiments described.

In an embodiment of the invention, the emergency responder is the first emergency responder and guiding the emergency responder is allowing the emergency responder to retreat along the path. This provides a simple, dependable and secure way for the first emergency responder to find or get out of the emergency scene.

According to another aspect of the invention, a computer program product comprising a computer readable medium having computer readable code embodied therein, the computer readable code being configured such that, on execution by a suitable computer or processor, the computer or processor is caused to perform the method of any of the embodiments. The technical effect of this computer program product is according to the technical effect described for the method.

According to another aspect of the invention, a computer readable medium comprising motion data, track data and/or path data suitable for use in any of the methods or systems of any of the embodiments. The technical effect of this computer readable medium is according to the technical effect described for the method. The technical effect of this method is according to the technical effect described. The method for aiding the first emergency responder may advantageously be combined with features of other embodiments described.

BRIEF DESCRIPTION OF THE DRAWINGS

The invention will be apparent from and elucidated further with reference to the embodiments described by way of example in the following description and with reference to the accompanying drawings, in which.

The figures are purely diagrammatic and not drawn to scale. In the figures, elements which correspond to elements already described may have the same reference numerals.

LIST OF REFERENCE NUMERALS

| | |
|---|---|
| 10 | building |
| 11 | room |
| 12 | hallway |
| 13 | door |
| 14 | stairs |
| 15 | cabinet |
| 20 | ground floor |
| 21 | first floor |
| 22 | second floor |
| 30 | blockade |
| 31 | wall |
| 32 | double doors |
| 100 | Method for aiding emergency responders in retrieving a path |
| 110 | first track |
| 111 | first emergency responder |
| 112 | second emergency responder |
| 113 | third emergency responder |
| 120 | first track start |
| 121 | first track transition from ground to first floor |
| 122 | first track transition from first to second floor |
| 123 | first track end |
| 126 | first section of first track |
| 127 | second section of first track |
| 130 | second track, marked with dots |
| 140 | first path, marked with crosses |
| 141 | second path, marked with triangles |
| 142 | second path start |
| 150 | emergency responder |
| 151, 151' | first motion sensor |
| 200 | method |
| 210 | receiving motion data |
| 220 | compiling track data |
| 230 | calculating path data |
| 240 | providing path data |
| 300 | system |
| 310 | first motion sensor unit |
| 315 | motion data |
| 320 | processing unit |
| 325 | path data |
| 330 | actuator |
| 1000 | computer program product |
| 1010 | computer readable medium |
| 1020 | computer readable code |
| d1, d2, d3, d4 | distance between first track sections |
| D, D' | distance between first track sections |
| T | travel direction |
| W | first track width |
| W1, W2 | first track width extension |

DETAILED DESCRIPTION OF EXEMPLARY EMBODIMENTS

The following figures may detail different embodiments. Embodiments can be combined to reach an enhanced or improved technical effect. These combined embodiments may be mentioned explicitly throughout the text, may be hint upon in the text or may be implicit.

Figure 1A:
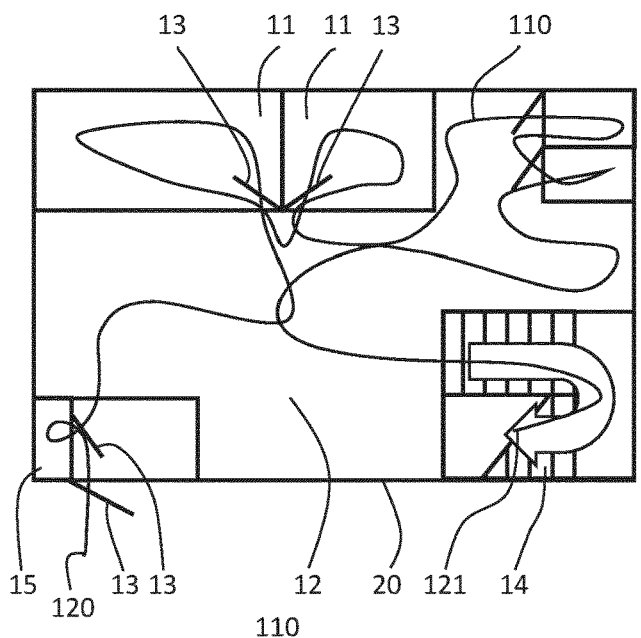
FIGS. 1a, b, c schematically shows a first top-view of three floors traversed by a first emergency responder.

FIGS. 1a, b, c schematically shows a first top-view of three floors traversed by a first emergency responder. Only for informative purposes the building layout is shown, it is not necessary for the method to have building layout knowledge. FIGS. 1a, b, c show the floor layout of respectively the ground floor, the first floor and the second floor of the building 10. The building comprises rooms 11, hallways 12, doors 13, stairs 14 and cabinets 15. Not all rooms, doors, stairs and cabinets are labelled, but clearly visible in the figures.

FIG. 1a shows the start 120 of the first track 110. The first track represents the track traversed or walked by the first emergency responder 111 shown in FIG. 1c. The track ends at the location of the first emergency responder. The track is represented by the track data inside the method. The track may be compiled directly from the trajectory of the motion sensor. The track may be compiled indirectly, such as through filtering, from the trajectory of the motion sensor. FIG. 1a further shows the transition 121 of the first track from the ground floor to the first floor.

Figure 1B:
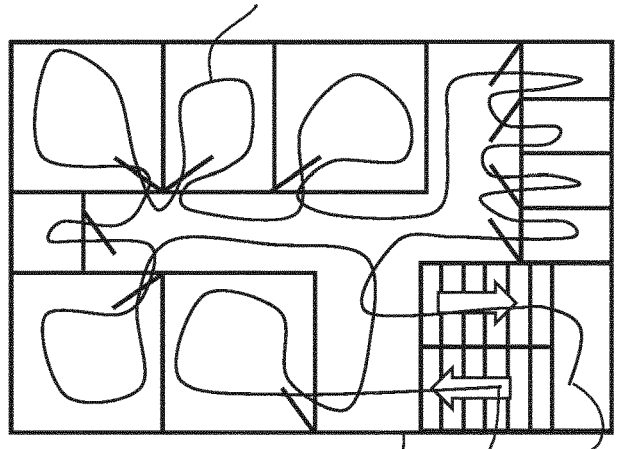

FIG. 1b shows that the first emergency responder has e.g. extensively checked, traversed or explored all areas of the first floor. The track 110 shows this extensive checking. FIG. 1b further shows the transition 121 from the ground floor to the first floor and the transition 122 from the first floor to the second floor.

Figure 1C:
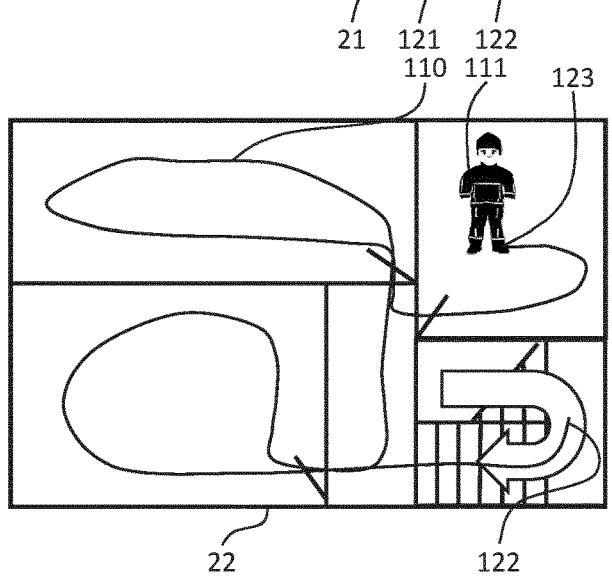

FIG. 1c shows the track 110 of the first emergency responder over the second floor. At the end of the track is the first emergency responder 111.

Typically, the first emergency responder has a motion sensor arranged for registering the motion of the first emergency responder. The motion data from the motion sensor is used to compile track data. The track data represents the first track taken by the first emergency responder. The first emergency responder may be a firefighter, police officer, ambulance officer, or any other person moving, exploring or traversing through an emergency scene. An emergency scene may be a scene with fire, riot, casualty, accident, or any other scene requiring immediate attention from a professional providing aid in that situation or scene. The emergency scene may be indoors, such as in a building, or outdoors, such as in a dense forest or a build-up area. The emergency scene typically is a stressful scene or situation requiring the full attention of the emergency responder to the task at hand and not particularly on navigating the scene. The emergency scene may impair the sensing, such as visual sensing and/or auditive sensing, of the emergency responder making navigating the emergency scene more difficult or even impossible. The emergency scene may be complex and/or elaborate such that the emergency responder may get lost without assistance, such as by the method or system according to the invention.

Figure 2A:
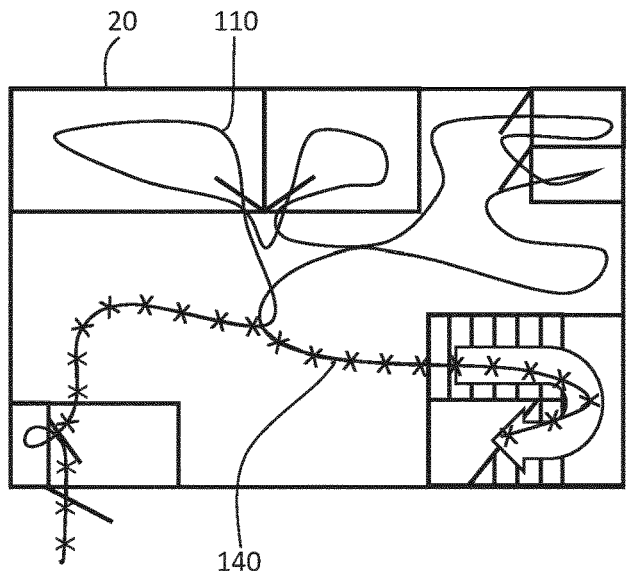
FIGS. 2a, b, c schematically shows a second top-view of the three floors traversed by a first emergency responder.
Figure 2B:
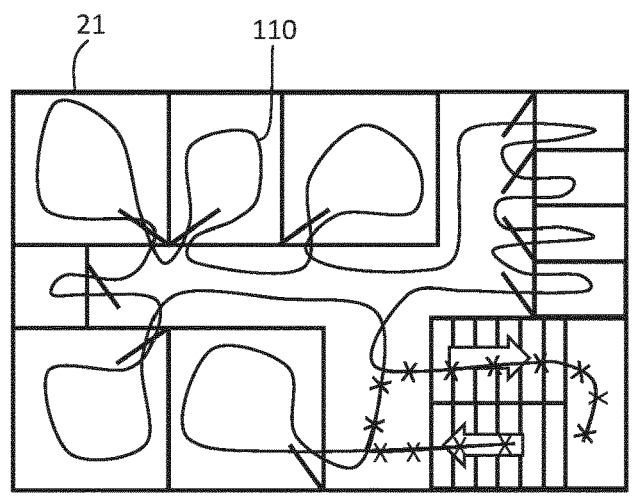
Figure 2C:
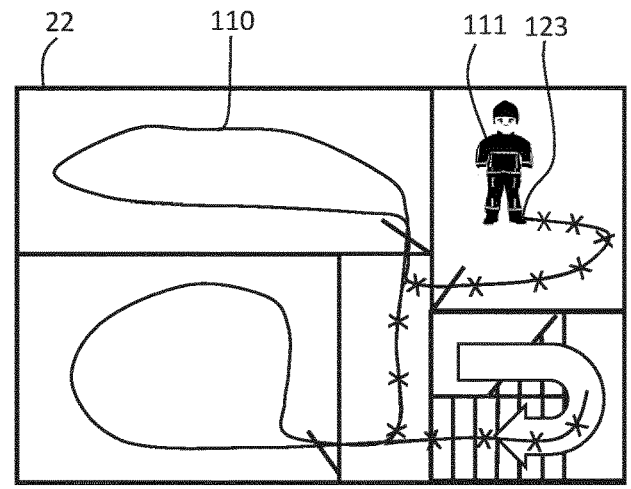

FIGS. 2a, b, c schematically show a second top-view of the three floors traversed by a first emergency responder. FIG. 2 show the same layout of the building as FIG. 1. Furthermore, FIG. 2 also show the first track and the first emergency responder.

FIG. 2 additionally show the path 140 calculated based on the track. The path is marked with crosses as it at least partly overlaps with the track. Typically, the path is a part of the track that allows the emergency responder to traverse the emergency scene preferably safely and/or quickly. The path may be the shortest way from the start of the track to the location of the first emergency responder.

The track data may comprise crossings of the first track with itself. If for example a second emergency responder, not shown, is traversing the emergency scene, also crossings between the first track and the second track may be taken into account when calculating and/or determining the path. Based on these crossings, parallel sections of the track may be identified. Based on these multiple parallel track sections, the path data may be calculated and is represented by the shown path.

Figure 3A:
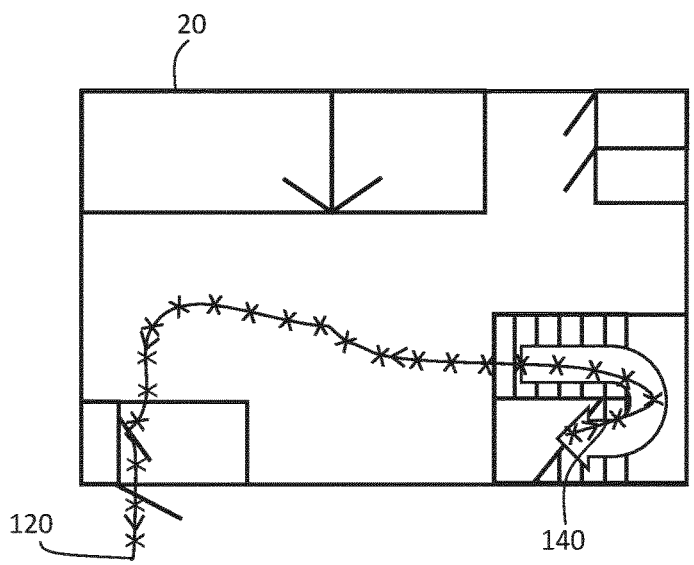
FIGS. 3a, b, c schematically shows a third top-view of the three floors traversed by a first emergency responder.
Figure 3B:
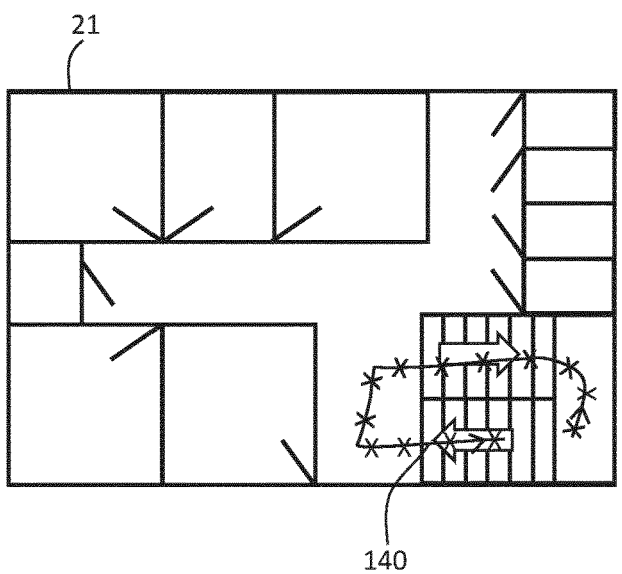
Figure 3C:
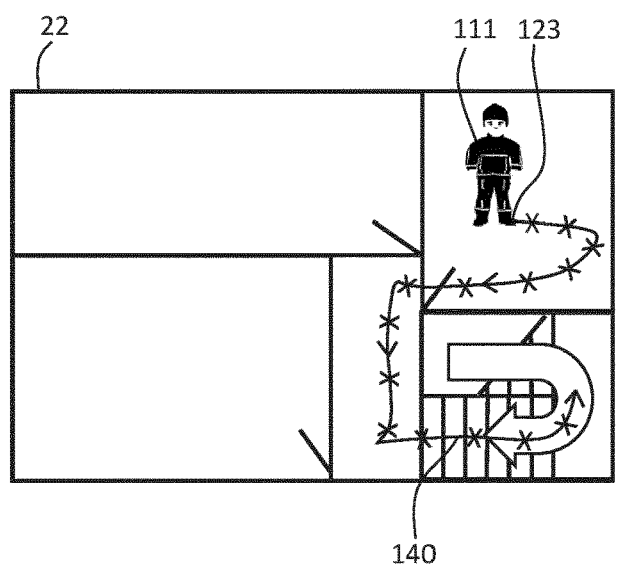
Figure 4A:
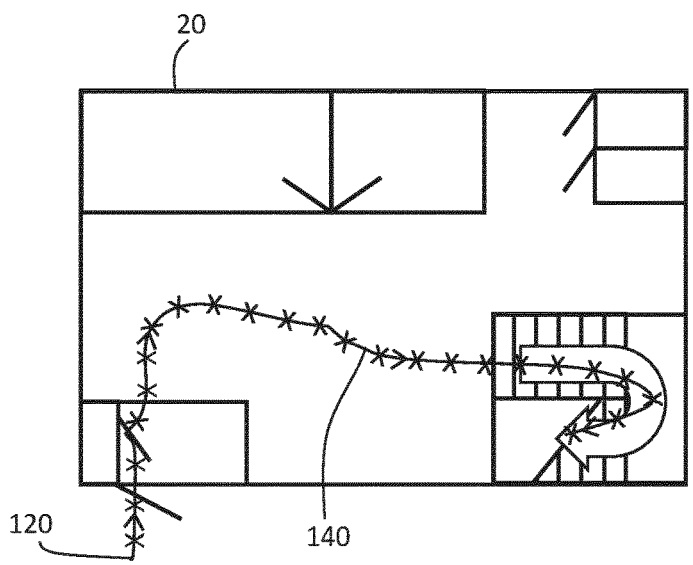
FIGS. 4a, b, c schematically shows a fourth top-view of the three floors traversed by a first emergency responder.
Figure 4B:
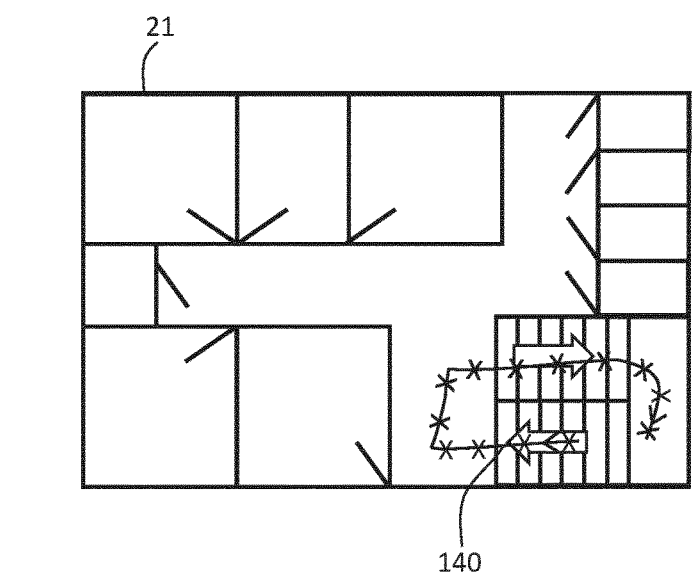
Figure 4C:
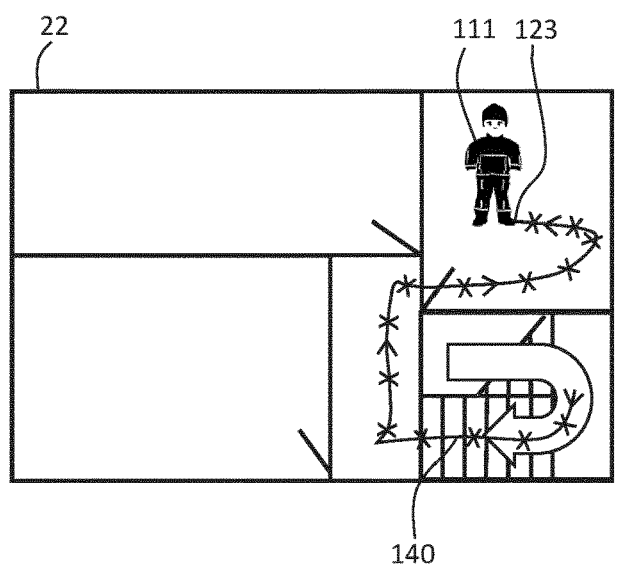

FIGS. 3a, b, c and FIGS. 4a, b, c schematically show a second top-view of the three floors traversed by a first emergency responder. FIGS. 3 and 4 show the same layout of the building as FIG. 1 and again this building layout is not necessary for the method to be applied or functioning. Furthermore, FIGS. 3 and 4 also show the path 140 marked with crosses and the first emergency responder.

In FIG. 3, the emergency responder using the path may be the first emergency responder. In this case the first emergency responder would like to leave the emergency scene via the start of the track in a simple, straight forward, safe, dependable, validated, quick, short way and typically in an intuitive way. The direction the path is travelled is marked with arrows on the path in the FIG. 3.

In FIG. 4, the emergency responder may be a second emergency responder and/or a third emergency responder or any number of emergency responder that want to get from the start 120 of the track to the location of the first emergency responder 111, which is at the end 123 of the track. The direction the path is travelled is marked with arrows on the path in the FIG. 4, which is opposite from the direction of travelling the path in FIG. 3. In this case, the emergency responder may be aiding the first emergency responder in any way, such as bringing additional equipment to the location of the first emergency responder. The path is aiding the emergency responder in finding the first emergency responder in a simple, straight forward, safe, dependable, validated, quick, short and typically in an intuitive way.

Figure 5:
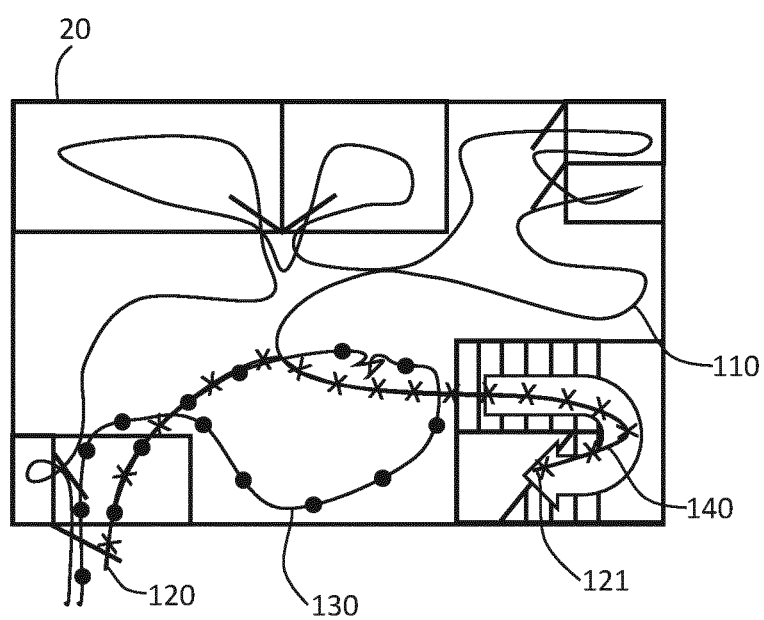
FIG. 5 schematically shows a fifth top-view of the ground floor traversed by a first emergency responder.

FIG. 5 schematically shows a fifth top-view of the ground floor traversed by a first emergency responder. The track data is compiled from the motion data of the first motion sensor arranged to the first emergency responder and the motion data of a second motion sensor arranged to the second emergency responder arranged to the second emergency responder. The track data therefore represents the first track and a second track. The first track 110 is marked with a line without any additional marking. The second track 130 is marked with a line with dots as additional marking. Based on the track data, the path data is calculated. The path data is visualized with the line marked with crosses. The assigning of the labels first track and second track is arbitrary. The path data may partly overlap with the first track and/or partly overlap with the second track for providing an optimal path to the emergency responder.

Figure 6A:
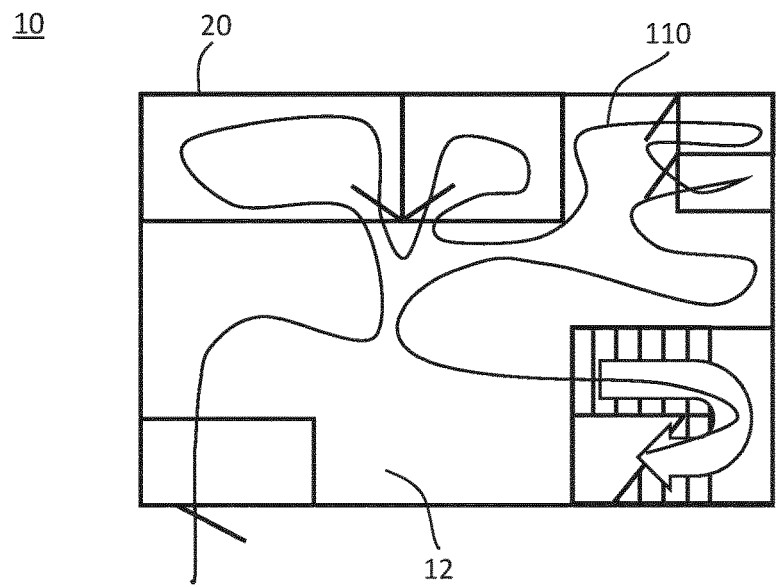
FIGS. 6a, b, c schematically all show a sixth top-view of the ground floor traversed by a first emergency responder.

FIGS. 6a, b, c schematically all show a sixth top-view of the ground floor traversed by a first emergency responder.

FIGS. 6a, b, c show the same layout of the building as FIG. 1. FIG. 6 show the first track 110. Furthermore, FIG. 6 also show the path 140 marked with crosses. FIG. 6a shows the first track without the path.

Figure 6B:
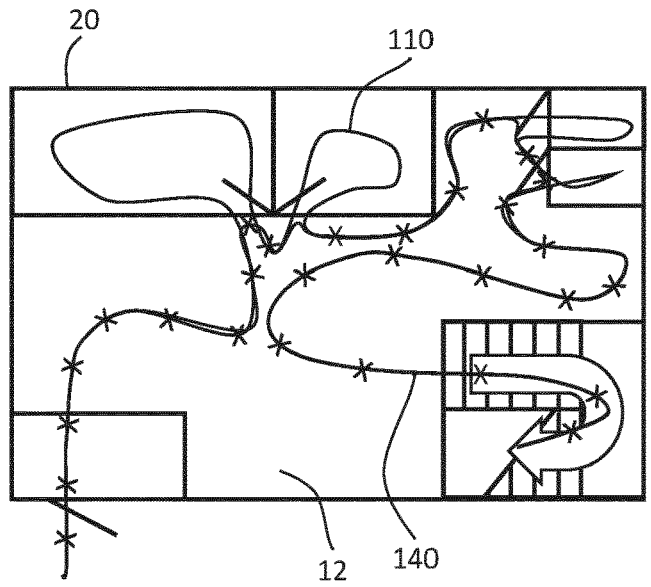

FIG. 6b shows the first track 110 with a path 140 calculated based on the track data. The first track is used to calculated the path and the path literally follows the path without deviating from the first track.

Figure 6C:
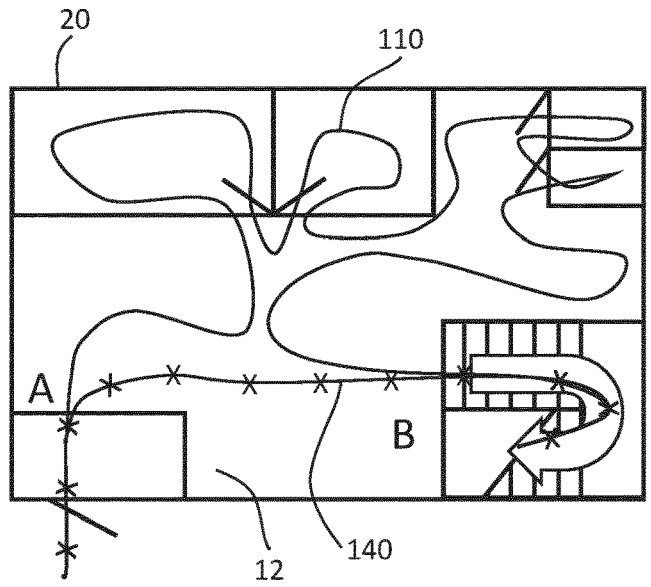

FIG. 6c shows the first track 110 with a path 140 calculated based on the track data. Although the first track is used to calculate the path, additional information may be used to calculate the path. This additional information may be building information showing that a straighter line may be followed for the path through the hallway of the building on the ground floor. This additional information may be track width information. This additional information may be received from other sensors. This additional information may be coming from an algorithm analyzing the motion data and/or the track data when calculating the path data. This algorithm may be an artificial intelligence algorithm e.g. recognizing patterns in the motion data and/or the track data.

Figure 7:
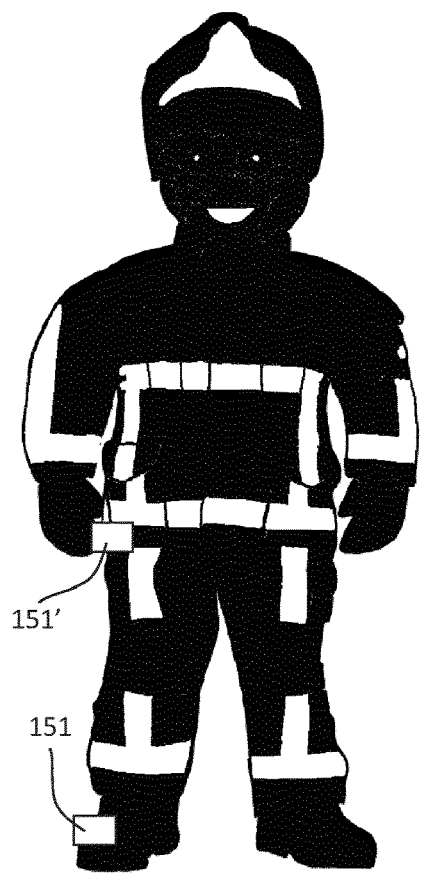
FIG. 7 schematically shows positions of the motion sensor on a first emergency responder.

FIG. 7 schematically shows positions of the motion sensor 151, 151' on a first emergency responder 111. The motion sensor 151 may be attached to the shoe of an emergency responder. This provides the advantage that when the shoe is placed on the ground, the motion sensor is having a motionless moment in time. Typically, gyroscope sensors have a tendency to drift. Having this motionless moment in time advantageously allows to recalibrate the gyroscope sensor to prevent drift from having a significant influence on the accuracy of the motion sensor. Alternatively, the motion sensor 151' may be attached to the hip, shoulder, head, helmet, SCBA, body of the first emergency responder.

Figure 8B:
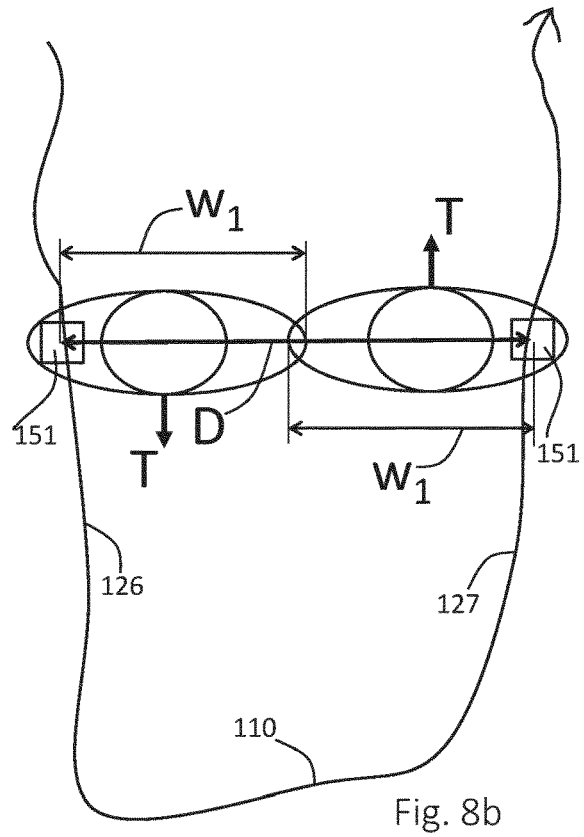
FIGS. 8a, b, c schematically show a first track width of a first emergency responder.
Figure 8A:
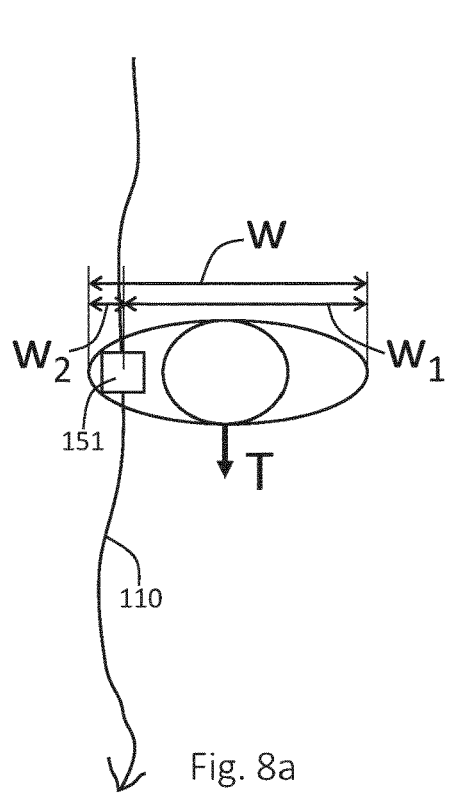

FIGS. 8a,b,c schematically show a first track width W of a first emergency responder 111. FIG. 8 show a first track 110 having a track width W wherein the track is traversed in a direction T. FIG. 8a shows the track width W of the first track 110. The track width typically extends to both sides of the motion sensor 151. As the motion sensor may be arranged to the shoe of the first emergency responder, the track width may be extending asymmetrical around the motion sensor, wherein the first track width W is divided up between a first track width extension W1 extending to the left for the first emergency responder and a second track width extension W2 extending to the right for the first emergency responder.

FIGS. 8b, c show a first section 126 and a second section 127 of the first track respectively. In FIG. 8b the first and second track sections are a distance D apart and are such close to each other that taking the track width into account it may be assumed that the first and the second track section overlap and thus represent a crossing of the first track. This crossing information may be used when calculating and/or determining the path. The distance between the first and the second track section may be smaller than two times the first track width extension W2. The distance between the first and the second track section may be smaller than two times the first track width extension W2 minus an additional margin, which might be a safety margin.

Figure 8C:
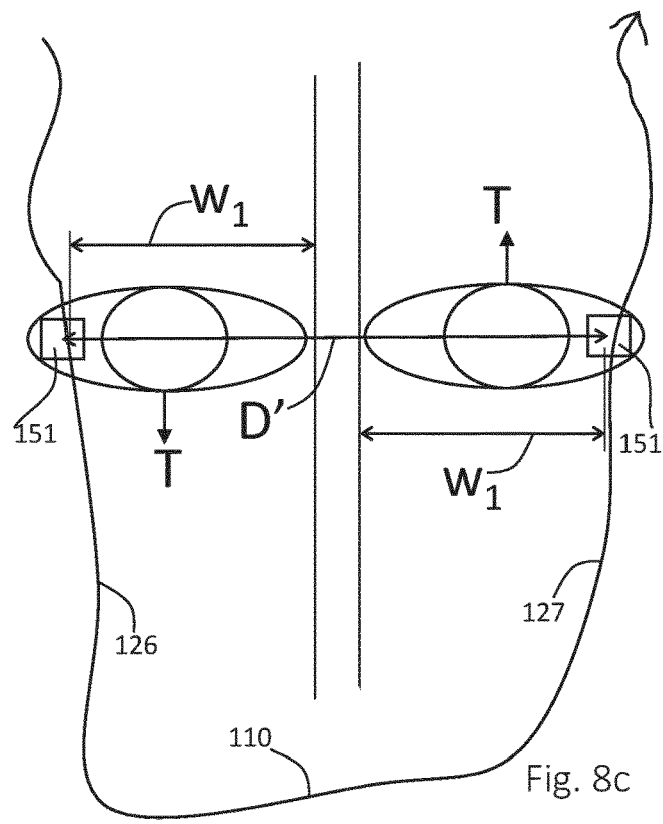

FIG. 8c the first and second track sections are a distance D' apart and are such far apart that taking the track width into account it may be assumed that the first and the second track section do not overlap and thus do not represent a crossing of the first track. This may for example be the case when the first emergency responder is travelling along a wall on both side, which e.g. typically happens when a firefighter is investigating an area. As the wall is typically an impenetrable object to the emergency responder following the path, the path should follow the first track going around the wall and should not indicate a shortcut through the wall.

Figure 9A:
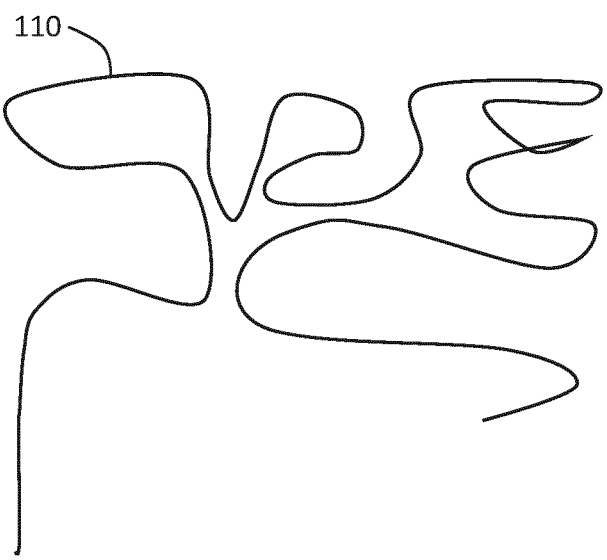
FIGS. 9a, b schematically show crossing detection in track data by proximity.
Figure 9B:
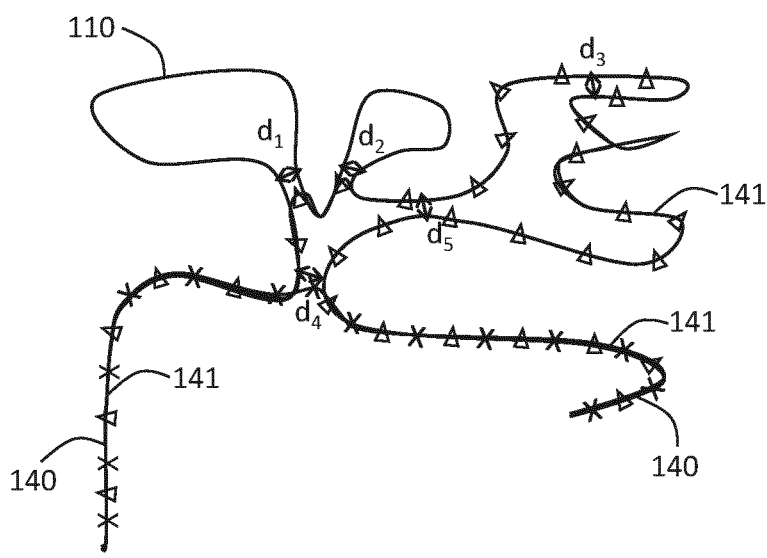

FIGS. 9a, b schematically show crossing detection in track data by proximity. FIG. 9a, b show the first track 110 as a continuous line. FIG. 9b further shows a first path 140 and a second path 141. The first path is marked with crosses, the second path is marked with triangles. Furthermore, in FIG. 9b the distance d1, d2, d3, d4 between several first track sections is shown.

For the first path it is assumed that the distance d4 is small enough to assume that the first track sections at this location may be seen as a crossing. This crossing may be assumed based on track width information. This crossing may be assumed based on building information and/or algorithms analyzing motion data and/or track data for providing room entry and exit information. Additionally, the room entry and room exit information may be based on using the direction in the motion data and/or the track data. Therefore, the first path jumps over the gap shown as distance d4.

For the second path it is assumed that the distance d3 and the distance d4 are too large to be seen as a crossing and the distance d1 and distance d2 may be seen as a crossing. Therefore, the second path does not jump over the gaps shown as distance d3 and distance d4, but does jump over the gaps shown as distance d1 and distance d2. This use of the proximity and assuming a crossing of sections of the first track may be based on the first track width. This use of the proximity and assuming a crossing of sections of a track may be based on a section of a first track and a section of a second track. This use of the proximity may be based on the use of pattern recognition in the track data and/or the motion data.

Figure 10A:
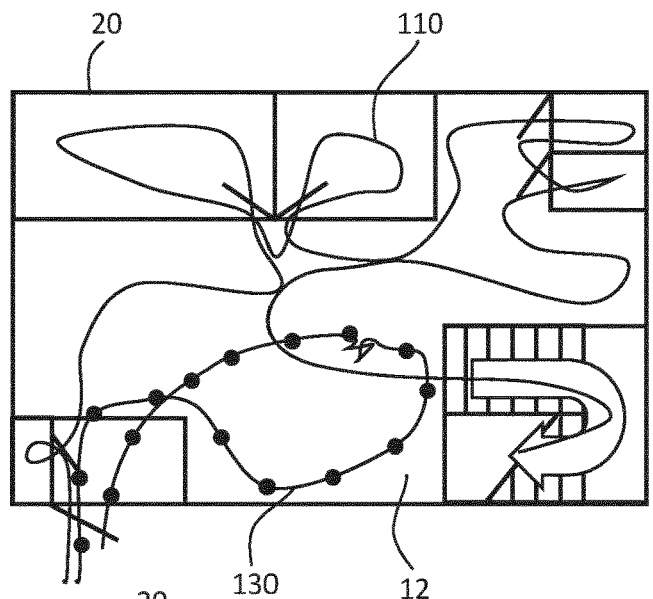
FIGS. 10a, b, c schematically shows a seventh top-view of the ground floor traversed by a first emergency responder with a changing situation.
Figure 10B:
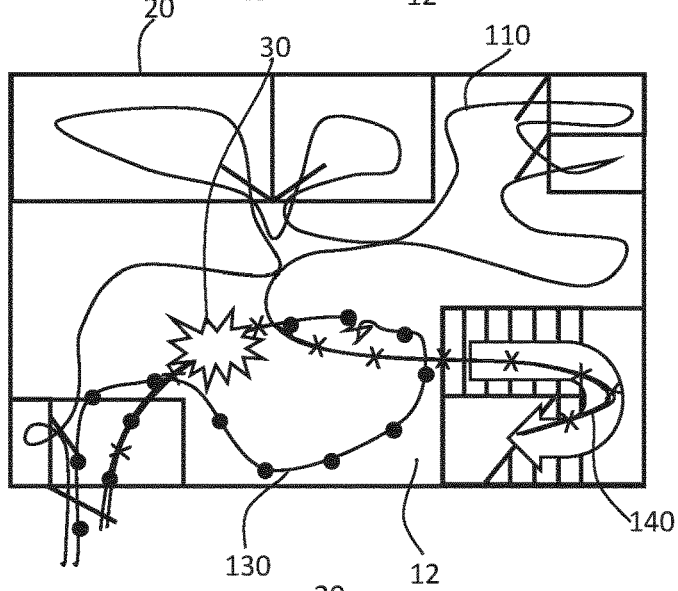

FIGS. 10a, b, c schematically shows a seventh top-view of the ground floor traversed by a first emergency responder with a changing situation. FIGS. 10a, b, c show the same layout of the ground floor of the building as FIG. 1a. FIG. 10 show the first track 110 and a second track 130 from a second emergency responder. Furthermore, FIGS. 10b, c also show the path 140 marked with crosses. When the emergency responder is the first emergency responder, or in other words, the first emergency responder wants to leave the emergency scene, the emergency responder follows the first path as shown in FIG. 10b. The first path leads the emergency responder to the blockade in the hallway. This blockade is an area that cannot be traversed by the emergency responder. This blockade may be a fire, hazardous opening in the floor, debris of some sort or anything else preventing the emergency responder to pass by the location.

Figure 10C:
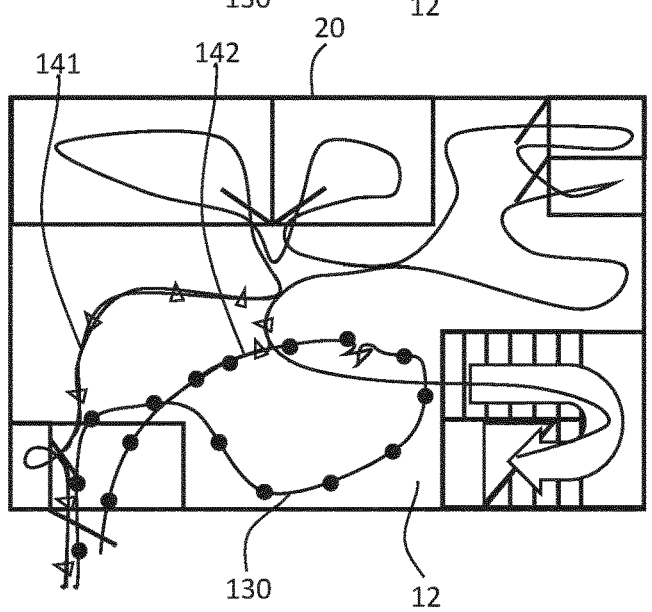

The emergency responder may indicate this blockade to the method, which uses this input for calculating and/or determining an alternative or second path 141. This blocked first path section is typically not used anymore for any calculation later on for paths for other emergency responders. The second path is marked with triangles and shown in FIG. 10c. The second path starts at the location of the emergency responder facing the blockade. FIG. 10c shows that the second path uses the first track to allow the emergency responder to safely traverse the hallway and around the blockade.

Figure 11A:
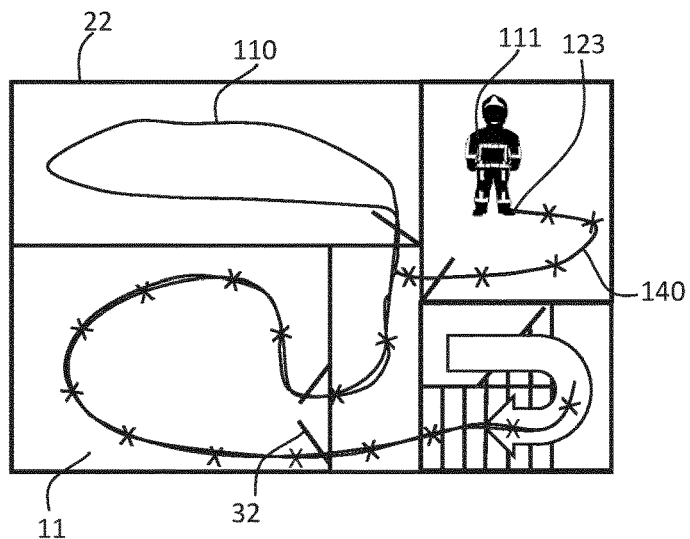
FIGS. 11a, b, c schematically shows an eighth top-view of the second floor traversed by a first emergency responder with the use of building information.

FIGS. 11a, b, c schematically shows an eighth top-view of the second floor traversed by a first emergency responder with the use of building information. FIG. 11a shows the same layout of the second floor 22 of the building 10 as FIG. 1c. FIG. 11 show the first track 110 from the first emergency responder 111. The emergency responder is the first emergency responder in this case.

FIG. 11a shows that the first track passes by double doors, wherein the first emergency responder has entered a room 11 via one of the double doors and left the room via the other of the double doors.

Figure 11B:
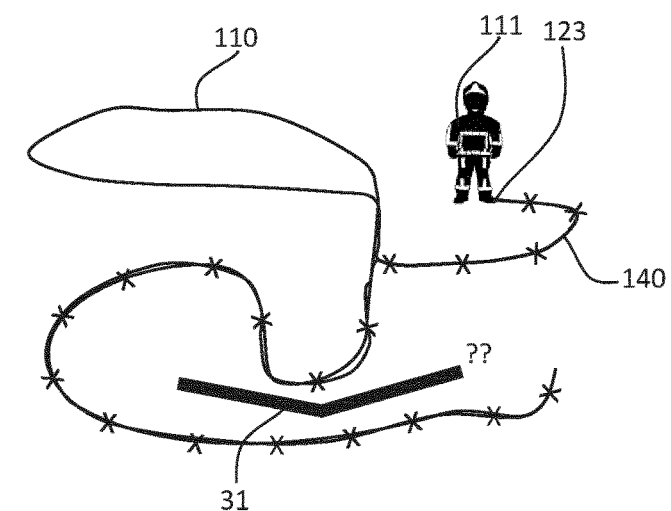
Figure 11C:
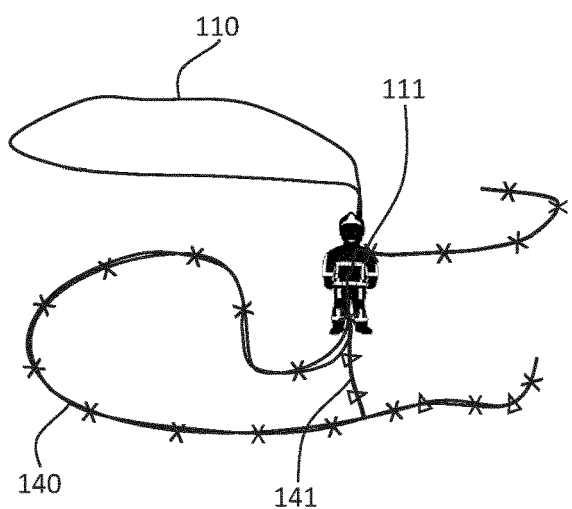

When now calculating the path, it has to be determined if the emergency responder using the path may have to follow the first path 140 and traverse the room as shown in FIG. 11b or may take a shortcut by following the second path 141. To determine if the second path is possible, it needs to be determined if there is for example a wall 31 at the location of the double doors or just double doors without any obstacle between these first track sections at the double doors. This may be determined based on building information, motion data, or combination.

Figure 12:
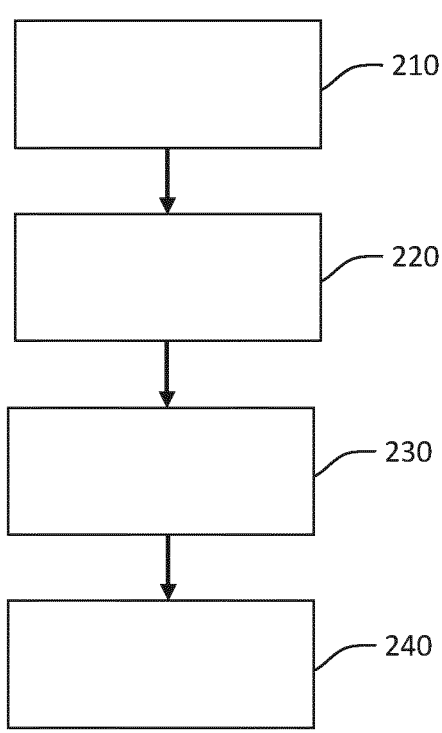
FIG. 12 schematically shows a method for aiding emergency responders in retrieving a path.

FIG. 12 schematically shows a method 200 for aiding emergency responders in retrieving a path. The method starts with receiving motion data 210 of a first motion sensor. The receiving of the motion data may be continuing while other steps of the method are performed in parallel. The method continuous with compiling 220 track data based on the motion data. The compiling of the track data may be continuing while other steps of the method are performed in parallel. The method thereafter continuous with calculating and/or determining 230 path data based on the track data. The calculating and/or determining of the path data may be continuing while other steps of the method are performed in parallel. The method thereafter continuous with providing 240 the path data to an actuator for guiding an emergency responder. The providing of the path data may be continuing while other steps of the method are performed in parallel.

Figure 13:
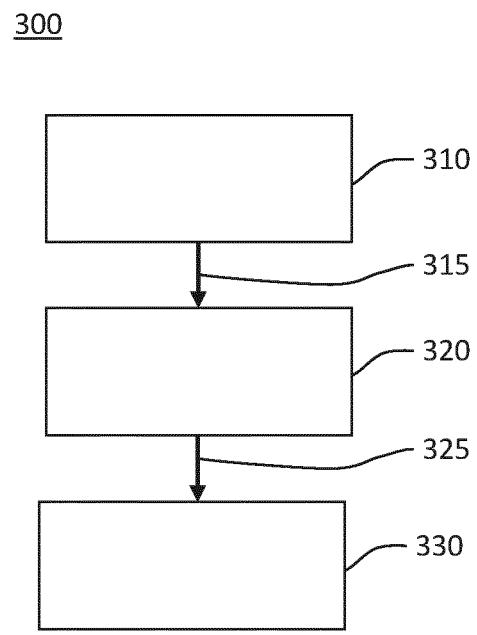
FIG. 13 schematically shows a system for aiding emergency responders in retrieving a path.

FIG. 13 schematically shows a system 300 for aiding emergency responders in retrieving a path. The system comprises a first motion sensor unit 310, a processing unit 320 and an actuator 330. The first motion unit comprises a motion sensor 151, 151'. The first motion sensor unit configured for registering motion of a first emergency responder of at least one emergency responder exploring an emergency scene. The motion unit may additionally comprise a communication module for communicating with the processing unit. The motion unit at least provides the motion data to the processing unit. The processing unit is configured for:

receiving motion data from the first motion sensor;
compiling track data based on the motion data of the first motion sensor, wherein the track data represents a first track of the first emergency responder through the emergency scene;
calculating path data based on the track data, wherein the path data represents a path coinciding with at least a part of the track; and
providing the path data.

The processing provides the path data to the actuator. The actuator is therefore arranged for receiving the path data and guiding an emergency responder of the at least one emergency responder along the path.

The communication between first motion sensor unit, the processing unit and the actuator may be wired or wireless. The actuator may be arranged to the same emergency responder or to another emergency responder. The processing unit may be arranged for controlling and/or servicing multiple motion sensors of different emergency responders. The processing unit may be arranged for controlling and/or servicing multiple actuators of different emergency responders. The processing unit may be centralized or may be distributed. The processing unit may be distributed in the sense that local at the first motion sensor unit the motion data may be processed to track data for communicating less data between parts of the distributed processing unit. The distributed processing unit may communicate wired or wireless between parts of the distributed processing unit. The processing unit may comprise an interface for a supervisor, such as a fire chief, to gain an overview of the emergency scene and the different locations of the emergency responders. The processing unit may comprise a database for storing the motion data, track data and/or path data.

Figure 14:
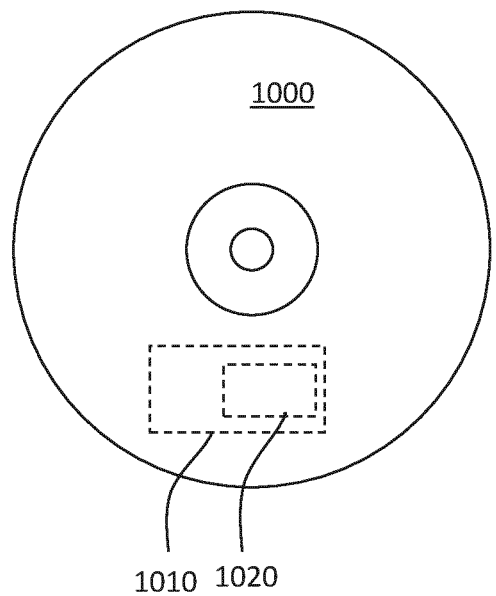
FIG. 14 schematically shows an embodiment of a computer program product, computer readable medium and/or non-transitory computer readable storage medium according to the invention.

FIG. 14 schematically shows an embodiment of a computer program product 1000, computer readable medium 1010 and/or non-transitory computer readable storage medium according to the invention comprising computer readable code 1020.

Examples, embodiments or optional features, whether indicated as non-limiting or not, are not to be understood as limiting the invention as claimed.

It should be noted that the figures are purely diagrammatic and not drawn to scale. In the figures, elements which correspond to elements already described may have the same reference numerals.

It will be appreciated that the invention also applies to computer programs, particularly computer programs on or in a carrier, adapted to put the invention into practice. The program may be in the form of a source code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

The invention claimed is:

1. A method for aiding emergency responders in retrieving a path, comprising:
  receiving motion data from a first motion sensor registering motion of a first emergency responder of at least one emergency responder exploring an emergency scene;

compiling track data based on the motion data of the first motion sensor, wherein the track data represents a first track of the first emergency responder through the emergency scene;

calculating path data based on the track data, wherein the path data represents a path coinciding with at least a part of the first track; and providing the path data to an actuator arranged for guiding an emergency responder of the at least one emergency responder along the path; wherein calculating the path data comprises:
  recognizing crossings in the track data for recognizing parallel tracks between crossings; and
  selecting one of the parallel tracks for the path data; and compiling the track data comprises:
  obtaining a location and/or an orientation of the first motion sensor on a body of the first emergency responder and/or equipment carried by the first emergency responder;
  obtaining a track width; and
  establishing the track data based on the motion data, the track width, and the location and/or the orientation of the first motion sensor.

2. The method according to claim 1, wherein the selecting is based on one or more of a group of a length of, a number of curves in, a duration to travel, a straightness of, and/or a closeness to other track sections of a track section.

3. The method according to claim 1,
wherein calculating the path data comprises calculating a length of each of the parallel tracks between crossings, and/or calculating a travel time of each of the parallel tracks; and
wherein the selecting one of the parallel tracks is based on the length and/or the travel time of the parallel tracks.

4. The method according to claim 1, wherein the actuator is a haptic actuator, arranged for providing a directional sensation to the at least one emergency responder for guiding the emergency responder.

5. The method according to claim 1, comprising receiving motion data from a second motion sensor registering motion of a second emergency responder of at least one emergency responder exploring an emergency scene; and wherein compiling track data is also based on the motion data of the second motion sensor.

6. The method according to claim 1,
wherein the at least one emergency responder is the first emergency responder; and/or
wherein the at least one emergency responder is a second or a third emergency responder.

7. The method according to claim 1, wherein calculating the path data comprises:
loading a building information model; and
optimizing the path data based on the building information model.

8. The method according to claim 1,
wherein the track data represents a gross displacement of the first emergency responder,
wherein the gross displacement comprises data of all steps, small and large, forward, backward and sideways as taken by the first emergency responder;
wherein the path data is arranged for guiding the at least one emergency responder along the path providing a net displacement; and
wherein the path data does not comprise data of all steps, small and large, forward, backward and sideways as taken by the first emergency responder.

9. The method according to claim 1, comprising
receiving a label labeling a particular location; and
wherein compiling track data is also based on the received label.

10. The method according to claim 9, wherein the label represents a location to be avoided and/or a location necessarily inserted in the path data.

11. A system comprising a microprocessor arranged and loaded with software for carrying out any of the methods according to claim 1.

12. A method for aiding a second emergency responder of at least one emergency responder in retrieving a path, comprising:
arranging a second actuator to a body of the second emergency responder; and
providing path data representing a path to the second actuator for guiding the second emergency responder along the path, wherein the path data is obtained by:
receiving motion data from a first motion sensor registering motion of a first emergency responder of at least one emergency responder exploring an emergency scene;
compiling track data based on the motion data of the first motion sensor, wherein the track data represents a first track of the first emergency responder through the emergency scene;
calculating path data based on the track data, wherein the path data represents a path coinciding with at least a part of the first track; and
providing the path data to the second actuator arranged for guiding the second emergency responder along the path; wherein
calculating the path data comprises:
  recognizing crossings in the track data for recognizing parallel tracks between crossings; and
  selecting one of the parallel tracks for the path data; and
compiling the track data comprises:
  obtaining a location and/or an orientation of the first motion sensor on a body of the first emergency responder and/or equipment carried by the first emergency responder;
  obtaining a track width; and
  establishing the track data based on the motion data, the track width, and the location and/or the orientation of the first motion sensor.

13. A method for aiding a first emergency responder of at least one emergency responder in retrieving a path, comprising:
arranging a first motion sensor to a first body of the first emergency responder;
receiving motion data from the first motion sensor registering motion of the first emergency responder exploring an emergency scene;
compiling track data based on the motion data, wherein the track data represents a first track of the first emergency responder through the emergency scene;
calculating path data based on the track data, wherein the path data represents a path coinciding with at least a part of the first track;
arranging an actuator to a second body of a second emergency responder of the at least one emergency responder; and
providing the path data to the actuator for guiding the emergency responder along the path; wherein
calculating the path data comprises:
  recognizing crossings in the track data for recognizing parallel tracks between crossings; and selecting one of the parallel tracks for the path data; and compiling the track data comprises:
- obtaining a location and/or an orientation of the first motion sensor on a body of the first emergency responder and/or equipment carried by the first emergency responder;
- obtaining a track width; and
- establishing the track data based on the motion data, the track width, and the location and/or the orientation of the first motion sensor.

14. A non-transitory computer readable medium storing a computer program that, when executed, causes a computer or processor to perform processing including:
- receiving motion data from a first motion sensor registering motion of a first emergency responder of at least one emergency responder exploring an emergency scene;
- compiling track data based on the motion data of the first motion sensor, wherein the track data represents a first track of the first emergency responder through the emergency scene;
- calculating path data based on the track data, wherein the path data represents a path coinciding with at least a part of the first track; and
- providing the path data to an actuator arranged for guiding an emergency responder of the at least one emergency responder along the path; wherein calculating the path data comprises:
- recognizing crossings in the track data for recognizing parallel tracks between crossings; and
- selecting one of the parallel tracks for the path data; and compiling the track data comprises:
- obtaining a location and/or an orientation of the first motion sensor on a body of the first emergency responder and/or equipment carried by the first emergency responder;
- obtaining a track width; and
- establishing the track data based on the motion data, the track width, and the location and/or the orientation of the first motion sensor.

* * * * *